(12) United States Patent
Hsieh et al.

(10) Patent No.: US 6,845,509 B2
(45) Date of Patent: Jan. 18, 2005

(54) DEVICE COMBINING SLIM CD-ROM DRIVE AND FLASH MEMORY CARD DRIVE

(76) Inventors: Hsiang-An Hsieh, Fl. 5, No. 1, Lane 45, Pao-Shing Rd., HsinDian City, Taipei (TW); Wei-Yueh Chien, Fl. 5, No. 1, Lane 45, Pao-Shing Rd., HsinDian City, Taipei (TW)

(*) Notice: Subject to any disclaimer, the term of this patent is extended or adjusted under 35 U.S.C. 154(b) by 187 days.

(21) Appl. No.: 10/244,159

(22) Filed: Sep. 16, 2002

(65) Prior Publication Data
US 2004/0052193 A1 Mar. 18, 2004

(30) Foreign Application Priority Data
Jun. 26, 2002 (TW) ............................ 91209662 U

(51) Int. Cl.$^7$ .................. G11B 17/13; G11B 17/04; G11B 33/02
(52) U.S. Cl. ........................................... 720/601
(58) Field of Search ................ 720/601, 616, 720/600, 615, 646, 652, 656; 365/185.01, 185.33; 369/77.1, 77.11, 75.21, 75.2

(56) References Cited

U.S. PATENT DOCUMENTS

| | | | |
|---|---|---|---|
| 6,441,784 B1 | * | 8/2002 | Flore et al. ............ 342/377 |
| 2002/0004863 A1 | * | 1/2002 | Kazo ...................... 710/62 |

* cited by examiner

Primary Examiner—Julie Anne Watko

(57) ABSTRACT

This invention provides a device combining a slim CD-ROM drive and a flash memory card drive, which utilizes the unused space in a slim CD-ROM drive to mount a flash memory card socket to form a combined device. It comprises of a seat with the first containing space and the second containing space. The first containing space hosts a circuit board and a driving unit, a standard CD-ROM drive with a panel on the front and the panel has a opening against the second containing space, a flash memory socket in the second containing space and its slot faces against the said opening of the panel. The socket can hold multi types of flash memory cards, including SD, MMC, and MS cards. Furthermore, there are multi PINs in the socket and they are connected to the circuit board on one end and contact the flash memory card on the other end to support access to the flash memory card.

8 Claims, 4 Drawing Sheets

DEVICE COMBINING SLIM CD-ROM DRIVE AND FLASH MEMORY CARD DRIVE

BACKGROUND OF THE INVENTION

1. Field of Invention

This invention relates to a device combining a slim CD-ROM drive and a flash memory card drive, which utilizes the unused space in a slim CD-ROM drive to mount a flash memory card socket to form a combined device.

2. Description of the Background Art

A flash memory card is a memory card involving one or more silicon chips, and it is often referred as a portable memory card. Because flash memory cards are small, power saving, large in volume, shock resistant, and rewritable, they have been widely used in Information Appliances (IAs) and various portable digital products, such as PDAs, DSCs, MP3 Players, etc.

Moreover, due to the shortcomings of diskettes or CDs in size, vibration resistance, shock resistance, and power consumption, flash memory cards are not only used in IAs (most are used to record digital audio/video) but also in consumer electronic appliances, and has become a main stream in the digital storage market.

However, said flash memory products have to utilize the interfaces in portable digital electronic products to connect to PCs or an additional flash memory card drive. Compared to the CD-ROM drive, flash memory products may consume more investment of a customer, which impairs the acceptance of those products in the market.

Of cause, a flash memory card drive may be installed as standard peripheral equipment on a PC. However, the overall cost of the PC will surely be higher. And more space in the PC will be occupied. How to integrate a flash memory card drive on a CD-ROM drive to form a combined device has become the main consideration of the inventor.

3. Traditional Technologies

As shown in FIG. 1, a legacy slim CD-ROM drive comprises of:

- a seat 1, which has a containing space 2 hosting a circuit board 3 and a driving unit 4 and a fixing plate 5 on each side of the seat to help fixing the seat on the case (not shown);
- a CD tray 6 on the seat 1 to hold a CD, the CD tray has a rotating shaft 97 and a read/write head, which is driven by a driving unit 4 to slide along the seat 1, the read/write head is connected to the circuit board 3.

When the operator controls the CD tray 6 sliding out of the seat 1, a CD can be put on the CD tray 6. After the CD tray 6 slides into the seat 1, it is driven by the rotating shaft 7 to rotate, and the read/write head moves to access the CD.

It should be noted that the sizes of the seat 1 and the CD tray 6 must be big enough to hold the CD. Though the circuit board 3 and the driving unit 4 are located in the containing space 2, the width of the containing space is usually smaller than that of the seat 1. Thus the fixing plate 5 extends from the containing space 2 to the edge of the seat 1 to fix the case (not shown) of the drive. And there is a spare space 9 under the fixing plate 5. If that space is utilized to contain a flash memory card socket, the CD-ROM drive can also serve as a flash memory drive.

SUMMARY OF THE INVENTION

This invention provides a device combining a slim CD-ROM drive and a flash memory card drive, comprising of:

- a seat with the first containing space and the second containing space, and the first containing space hosts a circuit board and a driving unit;
- a CD tray on the seat, the CD tray has a rotating shaft and an CD read/write head that can slide along the seat driven by the driving unit, there is a panel on the front of the CD tray and an opening on the panel against the second containing space; and
- a flash memory card socket in the second containing space, the slot of the socket faces against the said opening to enable insertion any one of SD, MMC, or MS cards, and there are multi PINs in the socket, the PINs connects with the circuit board at one end and contacts the interface of the flash memory card to access the flash memory card.

The main purpose of this invention is to utilize the spatial structure constructed with the seat, the CD tray, and the flash memory card socket to implement a flash memory card drive without increasing the size. Such a device not only eliminates the need to purchase an independent flash memory card drive, but also adds value to the CD-ROM drive.

The embodiments of this invention are further detailed in the following description and instructions. However, the names of elements mentioned here are only used to help describing the technologies involved in this invention, and should not constitute any limitation to the claims. Any equivalent implementation according to this invention should fall into the category of this invention.

| Instruction to Symbols | |
| --- | --- |
| Seat 10 | First Containing Space 11 |
| Second Containing Space 12 | IC 121 |
| Memory 122 | Circuit Board 13 |
| First Circuit Board 131 | Second Circuit Board 132 |
| Driving Unit 14 | Slide Rail 141 |
| Propelling Structure 142 | CD Tray 20 |
| Rail Bar 21 | CD 22 |
| Rotating Shaft 23 | CD Read/Write Head 24 |
| Panel 25 | Opening 26 |
| Socket for Flash Memory Card 30 | Slot 31 |
| Flash Memory Card 32 | PINs 33 |
| Fixing End 331 | Contact End 332 |

DETAILED DESCRIPTION OF THE DRAWINGS

Figure 2:
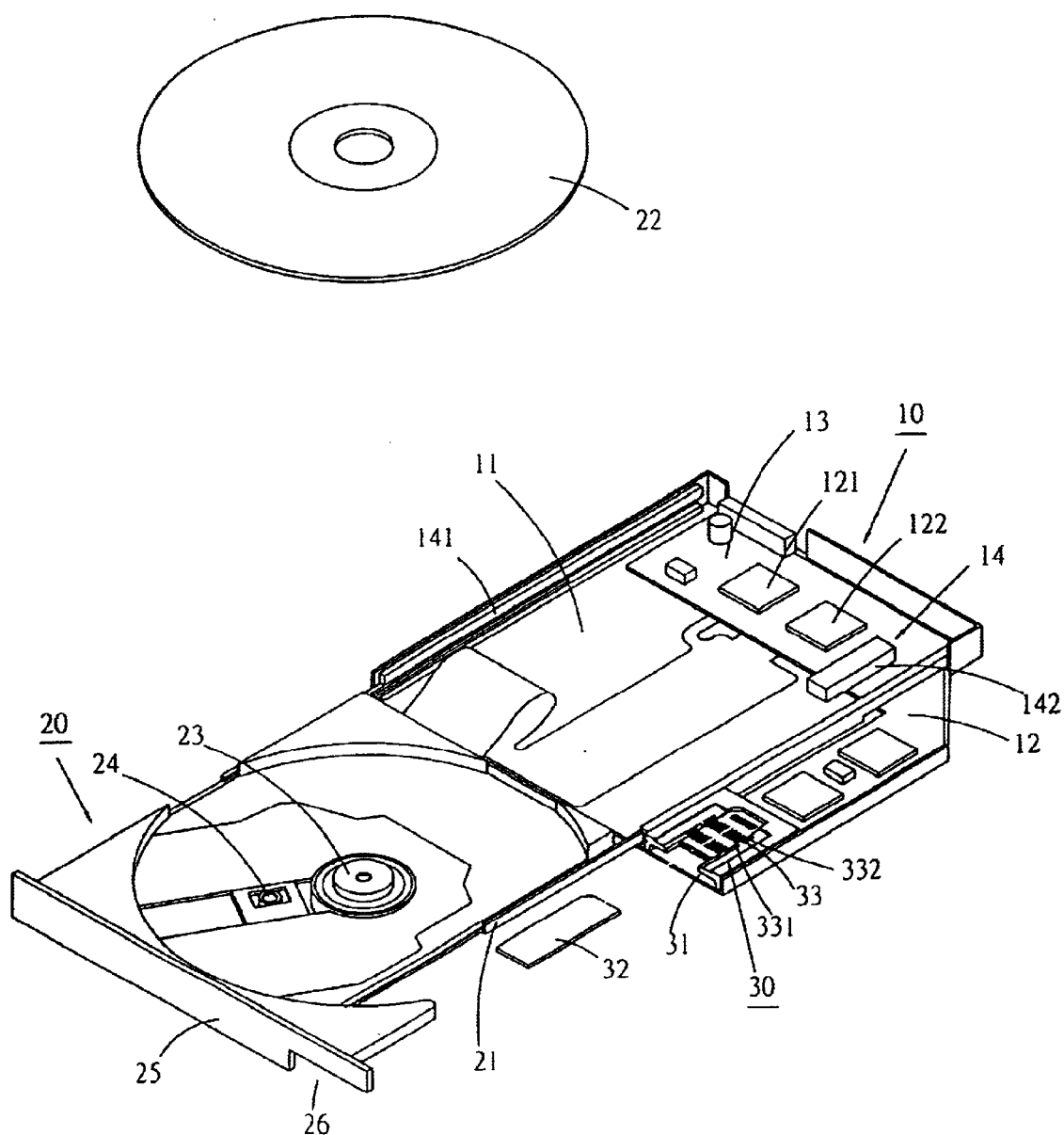
FIG. 2 is a 3D exploded view of this invention.
Figure 3:
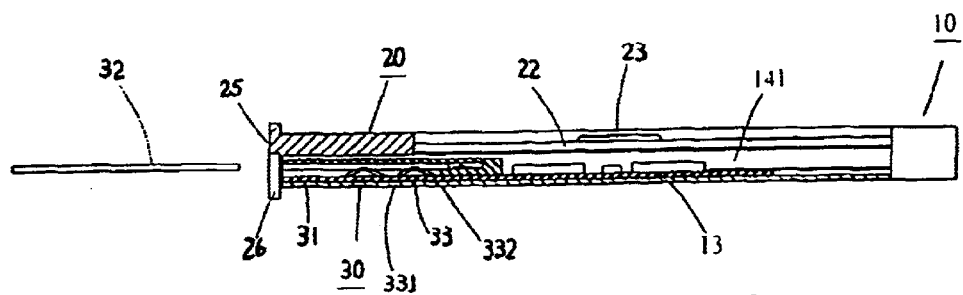
FIG. 3 is a sketch map 1 of the actions of this invention.
Figure 4:
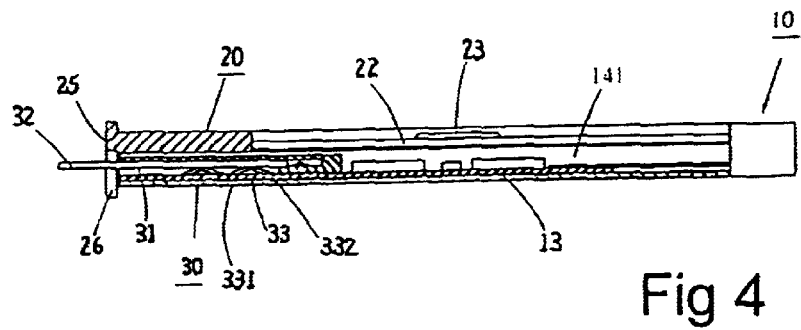
FIG. 4 is a sketch map 2 of the actions of this invention.

As shown in FIG. 2 to FIG. 4, the device combining a slim CD-ROM drive and a flash memory card drive comprises of a seat 10, a CD tray 20, and a flash memory card socket 30. The seat 10 employs a tank structure and can be fixed on a case (not shown). The seat 10 has the first containing space 11 and the second containing space 12. The first containing space hosts a circuit board 13 and a driving unit 14; the said circuit board 13 has several ICs 121, a ROM 122, and other necessary electronic elements. The driving unit 14 is in the first containing space 11, and it comprises of a slide rail 141 and a propelling component 142, which may be a small electromagnetic valve.

The CD tray 20 is located on the seat 10, and it has a rail bar 21 against the slide rail 141 at the bottom. Thus the CD tray 20 can slide back and front. There is a clamp structure (no shown) on the CD against the driving unit 14. Thus the CD tray 20 can slide out and slide back and be clamped at the correct position. The CD tray 20 can hold a CD 22 on it, and it has a rotating shaft 23 and a CD read/write head connected to the circuit board 13 There is a panel 25 on the front of the CD tray 20, and there is an opening 26 on the panel 25 against the second containing space 12.

When the CD tray 20 slides out under the drive of the driving unit 14, a CD 22 can be put on it. After the CD tray 20 slide back with the CD 22, the rotating shaft 23 can drives it to make the CD rotate. And then the CD read/write head 24, which is connected to the circuit board 13, can access the information stored in the CD 22.

The said flash memory card socket 30 is located in the second containing space 12, and its slot 31 faces against the opening of the CD tray 20 to enable insertion any one of SD, MMC, or MS cards 32. The flash memory card socket 30 has multi PINs 33 in it. The fixing end 331 of the PINs is connected to the circuit board 13 on one end, and the contact end 332 is connected to the interface of the flash memory card 32 in the slot 31. In this way, signals can be transferred to the circuit board 13 to instruct the device to access information in the flash memory card.

When the CD tray 20 slides out under the drive of the driving unit 14, the user can lay a CD 22 on it and push it back. At this time, the opening 26 on the panel 25 against the second containing space 12 faces against the slot 31 on the socket 30. The user can insert a flash memory card (SD, MMC, or MS) into the slot 31. Then the device can store or back up information into the CD-ROM or the flash memory card. If the user only wants to store or back up information into the flash memory card 32, the CD tray 20 needn't to slide out.

Figure 1:
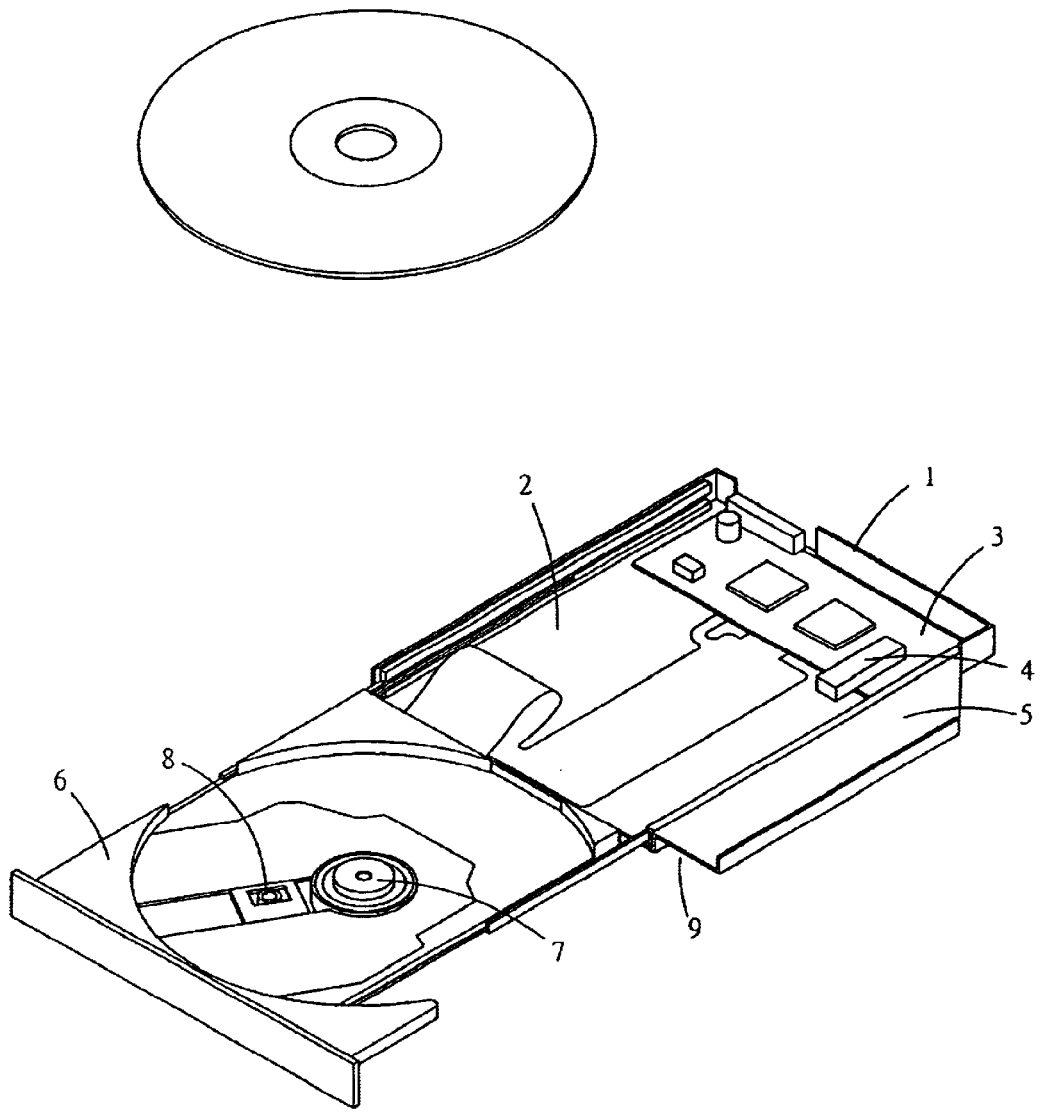
FIG. 1 is a 3D exploded view of a legacy slim CD-ROM drive.

In above embodiments, in order to deploy a the CD tray 20 and the flash memory card socket 30 on the circuit board 13 together, the shapes of the circuit board 13 and the seat 10 are slightly different to those in a legacy slim CD-ROM (FIG. 1). However, the overall shape (L, W, H) of the device still complies the specification for slim CD-ROM drives. Hereunder we introduce an embodiment that doesn't require modifying the original size of a legacy slim CD-ROM drive.

Figure 5:
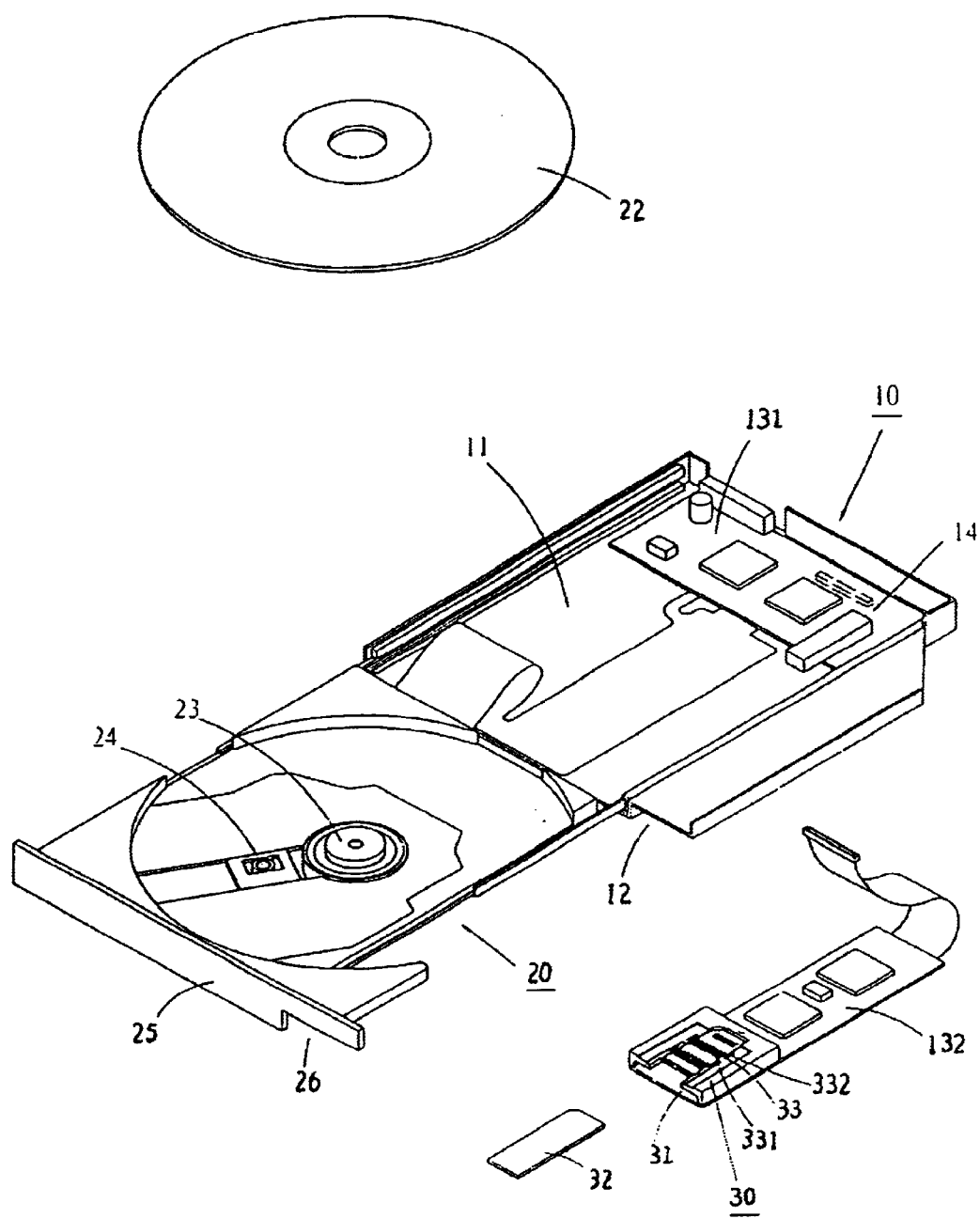
FIG. 5 is the second embodiment of this invention.

As shown in FIG. 5, the device combining a slim CD-ROM drive and a flash memory card drive in this invention comprises of a seat 10, a CD tray 20, and a flash memory card socket 30. The seat 10 employs a tank structure and has the first containing space 11. There is a fixing plate 111 on one side of the first containing space 11 and the fixing plate 11 can be fixed on the case (not shown). The fixing plate 111 shades the second containing space 12. There are the first circuit board 131 and a driving unit 14 in the first containing space 11. And there is the second circuit board 132 in the second containing space. The first circuit board 131 is connected to the second circuit board 132 through a flexible circuit board connector (IDE interface). There are multi ICs, a memory, and necessary electronic elements on the first circuit board 131 and the second circuit board 132, respectively. The driving unit 14 is similar to that in the first embodiment in this document.

The CD tray 20 is located on the seat 10. In this way, in the spatial structure constructed with the seat, the CD tray, and the flash memory card socket, the function of a flash memory card drive is implemented without increase the size of the legacy slim CD-ROM drive. Such a device eliminates the need to purchase an independent flash memory card drive and adds value to the CD-ROM drive. The structure and efficacy of this invention meet the requirements for "innovation" and "advancement" in the Patent Law, thus the inventor applies for a new patent with it.

When the CD tray 20 slides out under the drive of the driving unit 14, a CD 22 can be put on it. After the CD tray 20 slide back with the CD 22, the rotating shaft 23 can drives it to make the CD rotate. And then the CD read/write head (24), which is connected to the first circuit board 131, can access the information stored in the CD 22.

The said flash memory card socket 30 is located in the second circuit board 132, and its slot 31 faces against the opening of the CD tray 20 to enable insertion any one of SD, MMC, or MS cards 32. The flash memory card socket 30 has multi PINs 33 in it. The fixing end 331 of the PINs is connected to the second circuit board 132 on one end, and the contact end 332 is connected to the interface of the flash memory card 32 in the slot 31. In this way, signals can be transferred to the second circuit board 132 to instruct the device to access information in the flash memory card.

When the CD tray 20 and the flash memory card socket are placed with CD and inserted with any one of SD, MMC, or MS cards 32, the first circuit board 131 and the second circuit board 132 can store or back up information into the CD 22 or the flash memory card 32.

The said invention provides a device combining a slim CD-ROM drive and a flash memory card drive, which comprises the seat, the CD tray, and the flash memory card socket to implement a flash memory card drive without increasing the size. Such a device not only eliminates the need to purchase an independent flash memory card drive, but also adds value to the CD-ROM drive. And its structure and effect have the characters of novelty and inventiveness. Thus applicant applies this invention according to the corresponding rules in patent laws.

What is claimed is:

1. A device combining a slim CD-ROM drive and a flash memory card drive, comprising:

a seat with a first containing space and a second containing space, the first containing space hosting a circuit board and a driving unit;

a CD tray, being slidably disposed on the seat, having a rotating shaft and a CD read/write head being connected to the circuit board, having a panel with an opening at the front thereof corresponding to the second containing space; and a flash memory card socket, being disposed in the second containing space, providing a slot facing the opening to hold a flash memory card, providing a plurality of pins with a fixed end thereof being connected to the circuit board and a contact end thereof being connected to an interface of the flash memory card to access information in the flash memory card.

2. The device combining a slim CD-ROM drive and a flash memory card drive as in claim 1, wherein the circuit board comprises a plurality of integrated circuits and a memory.

3. The device combining a slim CD-ROM drive and a flash memory card drive as in claim 1, wherein the driving unit has a slide rail with a propelling structure, a rail bar is disposed at the bottom of the CD tray corresponding to the slide rail and a clamp is provided corresponding to the driving unit such that the CD tray can slide back and forth and be clamped at a correct position.

4. The device combining a slim CD-ROM drive and a flash memory card drive as in claim 1, wherein the flash memory card socket is a 3-in-1 socket and the flash memory card can be any one of SD, MMC and MS cards.

5. A device combining a slim CD-ROM drive and a flash memory card drive, comprising:

a seat, providing a tank structure with a first containing space and a second containing space, having a fixing plate being disposed at one side of the first containing space to shade the second containing space, having first circuit board and a driving unit being in the first containing space and a second circuit board being in the second containing space with the first circuit board being connected to the second circuit board through a flexible circuit board connector;

a CD tray, being located on the seat to hold a CD, having a rotating shaft and a CD read/write head being connected to the first circuit board, being capable of sliding on the seat under the drive of the driving unit, providing a panel at the front thereof with an opening corresponding to the second containing space; and a flash memory card socket, being received in the second containing space with a slot facing said opening to enable insertion of the flash memory card, having a plurality of pins with a fixing end thereof connecting with the second circuit board and a contact end thereof connecting with an interface of the flash memory card to access information in the flash memory card.

6. The device combining a slim CD-ROM drive and a flash memory card drive as in claim 5, wherein the first and second circuit board comprise a plurality of integrated circuits and a memory, respectively.

7. The device combining a slim CD-ROM drive and a flash memory card drive as in claim 5, wherein the driving unit has a slide rail with a propelling structure, a rail bar is disposed at the bottom of the CD tray corresponding to the slide rail and a clamp is provided corresponding to the driving unit such that the CD tray can slide back and forth and be clamped at a correct position.

8. The device combining a slim CD-ROM drive and a flash memory card drive as in claim 5, wherein the flash memory card socket is a 3-in-1 socket and the flash memory card can be any one of SD, MMC and MS cards.

* * * * *